UNITED STATES PATENT OFFICE 2,554,447

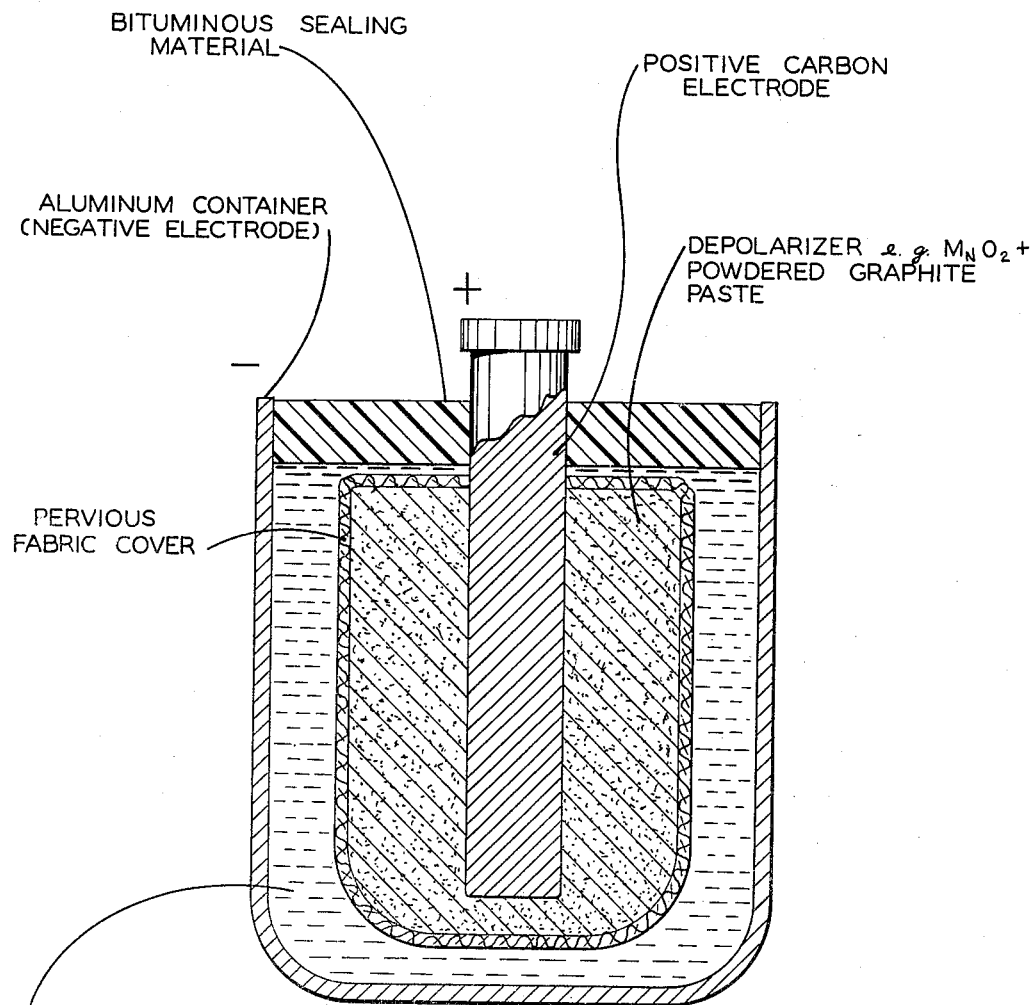

VOLTAIC CELL

Donald E. Sargent, Easton, Pa., assignor to General Aniline & Film Corporation, New York, N. Y., a corporation of Delaware Application January 26, 1949, Serial No. 72,998

14 Claims. (Cl. 136—100)

This invention relates to a new and improved voltaic cell, especially adapted for use as a so-called dry cell.

It is an object of this invention to provide a voltaic cell suitable for use as a dry cell, having a negative electrode of aluminum, said cell having a relatively high energy capacity per unit weight of the negative electrode, and being adapted for prolonged storage under open circuit conditions without excessive corrosion of the aluminum electrode or deterioration of the cell.

Dry cells in common use have a negative electrode of zinc, ordinarily in the form of a hollow container, and a positive carbon electrode surrounded with a manganese dioxide composition as a depolarizer, and a saline electrolyte containing a gelatinous ingredient and ordinarily ammonium chloride and zinc chloride, the electrolyte and carbon electrode assembly being inserted in the zinc container. Such cells are subject to deterioration during prolonged storage or prolonged periods of non-use, mainly as a result of the corrosion of the zinc electrode. As compared with aluminum, zinc is inferior as a negative electrode material from the standpoint of output per unit weight, cost, and electromotive force. Thus, the equivalent weight of aluminum is 9, whereas the equivalent weight of zinc is 32.5, so that the amount of zinc required for a given energy output is nearly four times the amount of aluminum. On a cost basis, aluminum is therefore much less expensive than zinc for comparable energy output, and the weight of equivalent cells is greatly reduced. Moreover, the potential of aluminum relative to hydrogen in the E. M. F. series is 1.70 as compared with 0.76 for zinc, so that an aluminum cell has a substantially higher voltage than a comparable zinc cell.

It has been proposed heretofore to employ aluminum as the negative electrode in primary cells having alkaline, saline or acid electrolytes, together with a positive electrode of carbon, but such cells have not attained any notable commercial success, for example, in the form of dry cells, despite the advantages indicated above characterizing aluminum as compared with zinc. This is apparently due to the excessive rate of corrosion of aluminum electrodes in the electrolytes heretofore employed, whereby the cells deteriorate rapidly during storage or periods of non-use.

I have discovered that a voltaic cell having aluminum as the negative electrode, satisfactory for use in the form of a dry cell, can be made by employing as the electrolyte an aqueous caustic alkali solution having zinc oxide dissolved therein, i. e., containing an alkali metal zincate. Such electrolytes do not cause excessive corrosion of the aluminum electrode when the cell is not in use, and operate satisfactorily to utilize the aluminum electrode efficiently, yielding a voltage somewhat higher than a zinc cell of comparable construction.

While it is not intended to limit this invention to any theory of operation, it appears probable that the aluminum displaces metallic zinc from the caustic alkali zincate solution constituting the electrolyte, and thus forms a protective zinc coating on the aluminum electrode, at least when the cell is not in use, preventing excessive corrosion of the electrode. When current flows through the cell, the aluminum is oxidized to aluminum hydroxide, some of which forms an alkali metal aluminate with the electrolyte the zinc coating either remaining on the surface of the aluminum or reforming thereon when the current is interrupted.

The proportions of caustic alkali and zinc oxide or hydroxide in the electrolyte employed in the cells of my invention can be varied over a wide range. The caustic alkali present in solution is considerably in excess of the amount required for formation of an alkali metal zincate, since an excess of caustic alkali is required to maintain the zincate in solution. Additional zinc oxide or zinc hydroxide may be included in the electrolyte, for example, in an amount sufficient to form a paste of the desired consistency. The presence of excess suspended zinc oxide or zinc hydroxide does not interfere with the operation of the cell. The caustic alkali employed can be either sodium or potassium hydroxide, the former being preferred because of its lower cost and greater ionic mobility. Thus, a suitable electrolyte can be prepared, for example, by saturating an aqueous caustic soda solution, e. g. of concentration of 5–40%, with zinc oxide or zinc hydroxide, the amount of zinc oxide in the resulting solution ranging from about 1–15% of the weight of the aqueous caustic soda solution. Preferably, the caustic soda solution is initially of a concentration from 10–30%, the zinc oxide dissolved therein being from about 1–10%.

The positive electrode in cells in accordance with my invention can be made of various materials such as iron, nickel, tin, lead or copper, but is preferably of carbon of high conductivity, such as a graphite rod. Conventional depolarizers which are adapted for use in conjunction with an alkaline electrolyte can be employed. Thus, a manganese dioxide composition similar to those employed in conventional dry cells can be provided, surrounding the positive carbon electrode. Alternatively, an organic depolarizer can be used in the same way, for example, azo-benzene; azoxybenzene; quinones such as benzoquinone; nitro compounds such as nitronaphthalene, dinitrotoluene; and other suitable oxidizing agents. The depolarizing material is preferably mixed with a powdered conductor such as powdered carbon, e. g. graphite, and may be conveniently molded around the positive carbon electrode in the form of an aqueous paste or molding composition moistened with water or with the electrolyte. If desired, the molded depolarizing composition can be reenforced by a pervious cover, e. g. of cotton, asbestos or similar fabric. The resulting positive electrode assembly can then be introduced into a cylindrical aluminum container, constructed like the zinc containers of commercial dry cells, and containing the aqueous alkaline zincate electrolyte described above. The top of the cell can then be sealed in the usual way with bituminous material such as sealing wax, thus yielding a dry cell of conventional design.

To immobilize the electrolyte in the manner ordinarily adopted in dry cell construction, inert thickening agents such as starch can be added thereto, or the electrolyte can be impregnated in an absorbent fibrous material such as paper, cotton, cellulosic fabrics or the like, which is interposed between the positive electrode-depolarizer assembly and the aluminum container serving as the negative electrode. Excess zinc oxide, which can be in hydrated form as the hydroxide or partly hydrated, can also be incorporated in the electrolyte, tending to immobilize it in the cell.

In the accompanying drawing, a conventional dry cell is shown in vertical cross section, illustrating an embodiment of the invention as hereinbefore described.

Instead of constructing the voltaic cell of my invention in the form of a conventional dry cell, other forms of cells may be employed which may be either dry cells or wet cells. In a wet cell, the aluminum electrode can be used as the container, or can be suspended in the form of a rod or plate in the electrolyte. The positive electrode, preferably surrounded by a depolarizing composition of the type hereinabove described can likewise be suspended in the electrolyte of a wet cell in accordance with this invention.

The voltaic cells of this invention are suitable for all of the purposes for which wet and dry cells having zinc electrodes are commonly used. The cells of this invention are lighter in weight than comparable zinc cells having an equivalent capacity, are cheaper, more efficient, and less subject to deterioration during storage or periods of non-use.

Variations and modifications which will be obvious to those skilled in the art can be made in the cells of my invention without departing from the scope or spirit thereof.

The cell electrodes are herein termed "positive" and "negative" on the basis of their polarity toward external circuits. With respect to the electrolyte within a cell of this invention, the aluminum (or "negative") electrode is the anode, and the "positive" electrode (e. g. carbon) is the cathode, during operation of the cell.

I claim:

1. A voltaic cell having a negative electrode of aluminum, and an aqueous caustic alkaline electrolyte containing an alkali metal zincate.

2. A voltaic cell having a negative electrode of aluminum, and as an electrolyte, a mixture of zinc oxide with an aqueous alkali metal hydroxide solution, at least part of the zinc oxide being dissolved in said solution.

3. A voltaic cell having a negative electrode of aluminum, and as an electrolyte, a 5–40% aqueous solution of an alkali metal hydroxide having at least 1% of zinc oxide dissolved therein.

4. A voltaic cell having a negative electrode of aluminum, and as an electrolyte, a 10–30% aqueous solution of sodium hydroxide having at least 1% of zinc oxide dissolved therein.

5. A voltaic cell having a negative electrode of aluminum, and as an electrolyte, a paste of zinc oxide with a 10–30% aqueous solution of sodium hydroxide having zinc oxide dissolved therein.

6. A voltaic cell having a positive electrode of carbon, a depolarizing composition surrounding the positive electrode, a negative electrode of aluminum, and an aqueous caustic alkaline electrolyte containing an alkali metal zincate.

7. A voltaic cell having a positive electrode of carbon, an organic depolarizing composition containing essentially a compound of the class consisting of azo-benzene and azoxy-benzene surrounding said positive electrode, a negative electrode of aluminum, and an aqueous caustic alkaline electrolyte containing an alkali metal zincate.

8. A dry cell comprising a container of aluminum, a centrally disposed carbon rod constituting the positive electrode, a mass of depolarizing composition surrounding said carbon electrode, and an aqueous caustic alkaline electrolyte containing an alkali metal zincate permeating said depolarizing composiiton and interposed between the same and said aluminum container.

9. A dry cell comprising a container of aluminum, a centrally disposed carbon rod constituting a positive electrode, a mass of depolarizing composition comprising essentially manganese dioxide and carbon surrounding said carbon electrode, and an immobilized aqueous caustic alkaline electrolyte containing an alkali metal zincate, permeating said depolarizing composition and interposed between the same and said aluminum container.

10. A dry cell comprising a container of aluminum, a centrally disposed carbon rod constituting a positive electrode, a mass of depolarizing composition comprising essentially at least one member of the class consisting of azoxy-benzene and azo-benzene surrounding said carbon electrode, and an immobilized aqueous caustic alkaline electrolyte containing an alkali metal zincate, permeating said depolarizing composition and interposed between the same and said aluminum container.

11. A dry cell comprising a container of aluminum, a centrally disposed carbon rod constituting the positive electrode, a mass of depolarizing composition surrounding said carbon electrode, and an electrolyte permeating said depolarizing composition and interposed between the same and said aluminum container, said electrolyte being a mixture of zinc oxide with an aqueous alkali metal hydroxide solution in which part of the zinc oxide is dissolved.

12. A dry cell comprising a container of aluminum, a centrally disposed carbon rod constituting the positive electrode, a mass of depolarizing composition surrounding said carbon electrode, and an electrolyte permeating said depolarizing composition and interposed between the same and said aluminum container, said electrolyte being a 5–40% aqueous alkali metal hydroxide solution containing at least 1% of zinc oxide dissolved therein.

13. A dry cell comprising a container of aluminum, a centrally disposed carbon rod constituting the positive electrode, a mass of depolarizing composition surrounding said carbon electrode, and an electrolyte permeating said depolarizing composition and interposed between the same and said aluminum container, said electrolyte being an aqueous 5–40% caustic soda solution containing at least 1% zinc oxide, and means for immobilizing said electrolyte.

14. A dry cell comprising a container of aluminum, a centrally disposed carbon rod constituting the positive electrode, a mass of depolarizing composition surrounding said carbon electrode, and an electrolyte permeating said depolarizing composition and interposed between the same and said aluminum container, said electrolyte being a paste of zinc oxide with a 10–30% aqueous caustic soda solution.

DONALD E. SARGENT.

REFERENCES CITED

The following references are of record in the file of this patent:

FOREIGN PATENTS

| Number | Country | Date |
|---|---|---|
| 16,471 | Great Britain | of 1915 |
| 334,420 | Great Britain | Sept. 4, 1930 |
| 397,475 | Great Britain | Aug. 22, 1933 |

OTHER REFERENCES

Norris: "Inorganic Chemistry," 1st edition (1921), page 465.